(12) United States Patent
Kajita

(10) Patent No.: US 11,531,315 B2
(45) Date of Patent: Dec. 20, 2022

(54) DISTRIBUTED CONTROL SYSTEM

(71) Applicant: Mitsubishi Electric Corporation, Tokyo (JP)

(72) Inventor: Tomoyuki Kajita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 134 days.

(21) Appl. No.: 16/629,200

(22) PCT Filed: Oct. 12, 2017

(86) PCT No.: PCT/JP2017/036946
§ 371 (c)(1),
(2) Date: Jan. 7, 2020

(87) PCT Pub. No.: WO2019/073565
PCT Pub. Date: Apr. 18, 2019

(65) Prior Publication Data
US 2021/0356929 A1  Nov. 18, 2021

(51) Int. Cl.
*G05B 19/05* (2006.01)
(52) U.S. Cl.
CPC ......... *G05B 19/054* (2013.01); *G05B 19/058* (2013.01)
(58) Field of Classification Search
None
See application file for complete search history.

(56) References Cited

U.S. PATENT DOCUMENTS

| | | | | |
|---|---|---|---|---|
| 2004/0227735 A1* | 11/2004 | Pratt | ..................... | G06F 3/0416 345/173 |
| 2009/0076628 A1* | 3/2009 | Smith | ..................... | G06F 8/656 700/3 |
| 2011/0022186 A1* | 1/2011 | Davlin | ............... | G05B 19/0421 700/3 |
| 2011/0054641 A1* | 3/2011 | Hur | ........................ | G08C 17/00 700/20 |

(Continued)

FOREIGN PATENT DOCUMENTS

| | | |
|---|---|---|
| CN | 107003651 A | 8/2017 |
| JP | H06259114 A | 9/1994 |
| JP | H06301409 A | 10/1994 |

OTHER PUBLICATIONS

Extended European Search Report dated Aug. 14, 2020 for corresponding European patent application No. 17928636.4, 8 pages.

(Continued)

*Primary Examiner* — Mohammad Ali
*Assistant Examiner* — David Earl Ogg
(74) *Attorney, Agent, or Firm* — Buchanan Ingersoll & Rooney PC

(57) ABSTRACT

A distributed control system includes: a plurality of control devices; a process IO master device shared by the control devices and including an output authority table and an output data memory having areas for storing data outputted from the control devices; and a plurality of process IO modules connected to the process IO master device and each connected to a sensor/actuator, wherein the output authority table provides an authority that determines the control device of which output data is to be adopted, for each of addresses corresponding to the actuators.

16 Claims, 15 Drawing Sheets

(56) References Cited

U.S. PATENT DOCUMENTS

| | | | | |
|---|---|---|---|---|
| 2012/0330452 A1* | 12/2012 | Guenther | ......... | G05B 19/41875 |
| | | | | 700/110 |
| 2013/0131839 A1* | 5/2013 | Washington | ......... | G05B 19/042 |
| | | | | 700/19 |
| 2015/0317195 A1* | 11/2015 | Wolpert | ................ | G06F 11/008 |
| | | | | 714/49 |
| 2017/0235517 A1 | 8/2017 | Okabe | | |
| 2017/0316061 A1* | 11/2017 | Hubauer | ........... | G06F 16/24575 |
| 2017/0317916 A1* | 11/2017 | Ozaki | ................ | G05B 19/0425 |
| 2018/0267711 A1* | 9/2018 | Kitamura | .............. | G06F 3/0634 |

OTHER PUBLICATIONS

International Search Report (PCT/ISA/210), with translation, and Written Opinion (PCT/ISA/237) dated Jan. 9, 2018, by the Japan Patent Office as the International Searching Authority for International Application No. PCT/JP2017/036946.

Communication pursuant to Article 94(3) EPC received for EP Patent Application 17928636.4, dated May 14, 2021, 5 pages.

First Office Action dated Aug. 23, 2022, issued in the corresponding Chinese Patent Application No. 201780095489.7, 14 pages including 6 pages of English Translation.

\* cited by examiner

FIG. 8A

OUTPUT AUTHORITY TABLE 60

| ADDRESS | OUTPUT AUTHORITY |
|---|---|
| Yα | 2CU |
| Yα+1 | 2CU |
| Yα+2 | 2CU |
| Yα+3 | 2CU |
| Yβ | 2CU |
| Yβ+1 | 2CU |
| Yβ+2 | 2CU |
| Yβ+3 | 2CU |
| Yγ | 1CU |
| Yγ+1 | 1CU |
| Yγ+2 | 1CU |
| Yγ+3 | 1CU |

*B1 (grouping the three 4-row blocks) — 61

FIG. 8B

OUTPUT AUTHORITY TABLE 201

| ADDRESS | SIZE | OUTPUT AUTHORITY |
|---|---|---|
| Yα | 4 | 2CU |
| Yβ | 4 | 2CU |
| Yγ | 4 | 1CU |

62

DISTRIBUTED CONTROL SYSTEM

TECHNICAL FIELD

The present invention relates to a distributed control system including a plurality of control devices and a process IO master device.

BACKGROUND ART

In distributed control systems for performing plant control, increase in processing speed, improvement in reliability, and improvement in flexibility of the system configuration are required.

For addressing these, disclosed is a controller that includes a plurality of CPUs, an arbitration memory, a program memory, and an input/output device and in which one program is executed in a divided manner by the plurality of CPUs (for example, Patent Document 1).

Another controller is disclosed in which a plurality of CPUs are provided with a function of reading and executing a sequence program on a one-circuit basis, buses are managed by a bus conflict management circuit, and execution of a program is managed by an execution management table, thereby performing parallel execution of the sequence program by the plurality of CPUs (see, for example, Patent Document 2).

CITATION LIST

Patent Document

Patent Document 1: Japanese Laid-Open Patent Publication No. 6-301409 (paragraphs [0007]-[0009] and FIG. 1)
Patent Document 2: Japanese Laid-Open Patent Publication No. 6-259114 (paragraphs [0010]-[0012] and FIGS. 1, 2)

SUMMARY OF THE INVENTION

Problems to be Solved by the Invention

However, Patent Documents 1 and 2 do not disclose a method for flexibly changing a combination of the controller and an input/output target device (sensor/actuator) and a process IO master device connected to the controller. Therefore, in sharing input data by control devices or changing an actuator to which data is to be outputted, hardware needs to be changed with outside wires, and thus there is a problem that flexible adaptation is impossible.

The present invention has been made to solve the above problem, and the present invention aims to provide a distributed control system capable of flexible adaptation in sharing input data by control devices or changing an actuator to which data is to be outputted.

Solution to the Problems

A distributed control system according to the present invention includes: a plurality of control devices; a process IO master device shared by the control devices and including an output authority table and an output data memory having areas for storing data outputted from the control devices; and a plurality of process IO modules connected to the process IO master device and each connected to a sensor and an actuator, wherein the output authority table provides an authority that determines the control device of which output data is to be adopted, for each of addresses corresponding to the actuators and the areas.

Effect of the Invention

The distributed control system according to the present invention includes: a process IO master device shared by control devices and including an output authority table and an output data memory having areas for storing data outputted from the control devices; and a plurality of process IO modules each connected to a sensor and an actuator, wherein the output authority table provides an authority that determines the control device of which output data is to be adopted, for each of addresses corresponding to the actuators. Therefore, without changing hardware with outside wires, it is possible to flexibly adapt to change of the actuator to which data is to be outputted, while sharing an input signal by the control devices.

BRIEF DESCRIPTION OF THE DRAWINGS

FIG. 8A illustrates an output authority table in a distributed control system according to embodiment 2 of the present invention.

FIG. 8B illustrates an output authority table in a distributed control system according to embodiment 2 of the present invention.

DESCRIPTION OF EMBODIMENTS

Embodiment 1

Embodiment 1 relates to a distributed control system that includes: a plurality of control devices; a process IO master device shared by the controlled devices and including an output authority table and an output data memory having areas for storing data outputted from the control devices; and a plurality of process IO modules each connected to a sensor and an actuator, wherein the output authority table provides an authority that determines the control device of which output data is to be adopted, for each of addresses corresponding to the actuators.

Hereinafter, the configuration and operation of the distributed control system according to embodiment 1 will be described with reference to FIG. 1 which is a configuration diagram of the distributed control system, FIG. 2 which is an internal configuration diagram of the process IO master device, and FIG. 3 to FIG. 7 which illustrate the function of the output authority table.

First, the entire configuration of the distributed control system according to embodiment 1 will be described with reference to FIG. 1.

The distributed control system 1 includes, as major components, control devices, a process IO master device, process IO modules, and sensors/actuators.

Figure 1:
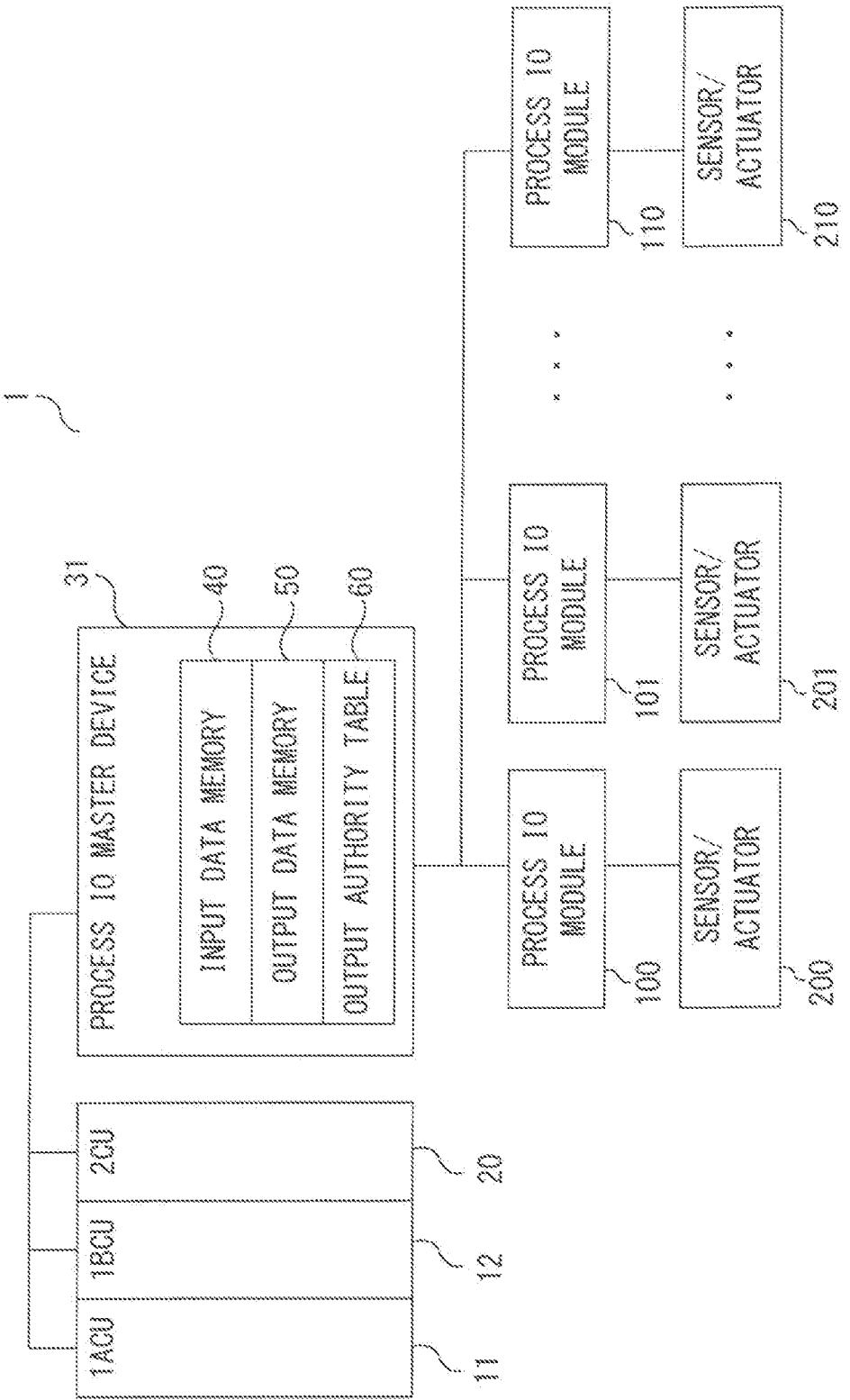
FIG. 1 is a configuration diagram of a distributed control system according to embodiment 1 of the present invention.

Specifically, in FIG. 1, the distributed control system 1 includes a first A control device 11, a first B control device 12, a second control device 20, a process IO master device 31, process IO modules 100 to 110, and sensors/actuators 200 to 210.

In FIG. 1, the first A control device is written as 1ACU (CONTROL UNIT), the first B control device is written as 1BCU, and the second control device is written as 2CU. The same applies to FIG. 2 and the subsequent figures.

If the process IO modules 100 to 110 need not be discriminated from each other, they may be referred to as process IO module 100. Also, if the sensors/actuators 200 to 210 need not be discriminated from each other, they may be referred to as sensor/actuator 200.

The first A control device 11, the first B control device 12, and the second control device 20, and the process IO master device 31 are connected to each other via a system bus or a network.

The process IO master device 31 and the process IO modules 100 to 110 are connected to each other via a field bus. The process IO modules 100 to 110 and the sensors/actuators 200 to 210 are respectively connected to each other via process signal lines.

The process IO master device 31 has an input data memory 40 for storing input data inputted from the sensors of the process IO modules 100 to 110.

The process IO master device 31 has an output data memory 50 for storing output data to be outputted to the actuators of the process IO modules 100 to 110.

Further, the process IO master device 31 has an output authority table 60 for setting an output authority that determines the control device of which output data is to be actually outputted to the actuator.

In FIG. 1, the first A control device 11 and the first B control device 12 have a duplex redundant configuration such that one of them is set as a control system and the other one is set as a standby system. In contrast, the second control device 20 has a simplex configuration, i.e., operates alone.

The above is merely a system example, and the number and combination of control devices are not limited thereto.

Next, with reference to FIG. 2, the internal configuration of the process IO master device 31, specifically, the configurations of the input data memory 40, the output data memory 50, and the output authority table 60 will be described.

Figure 2:
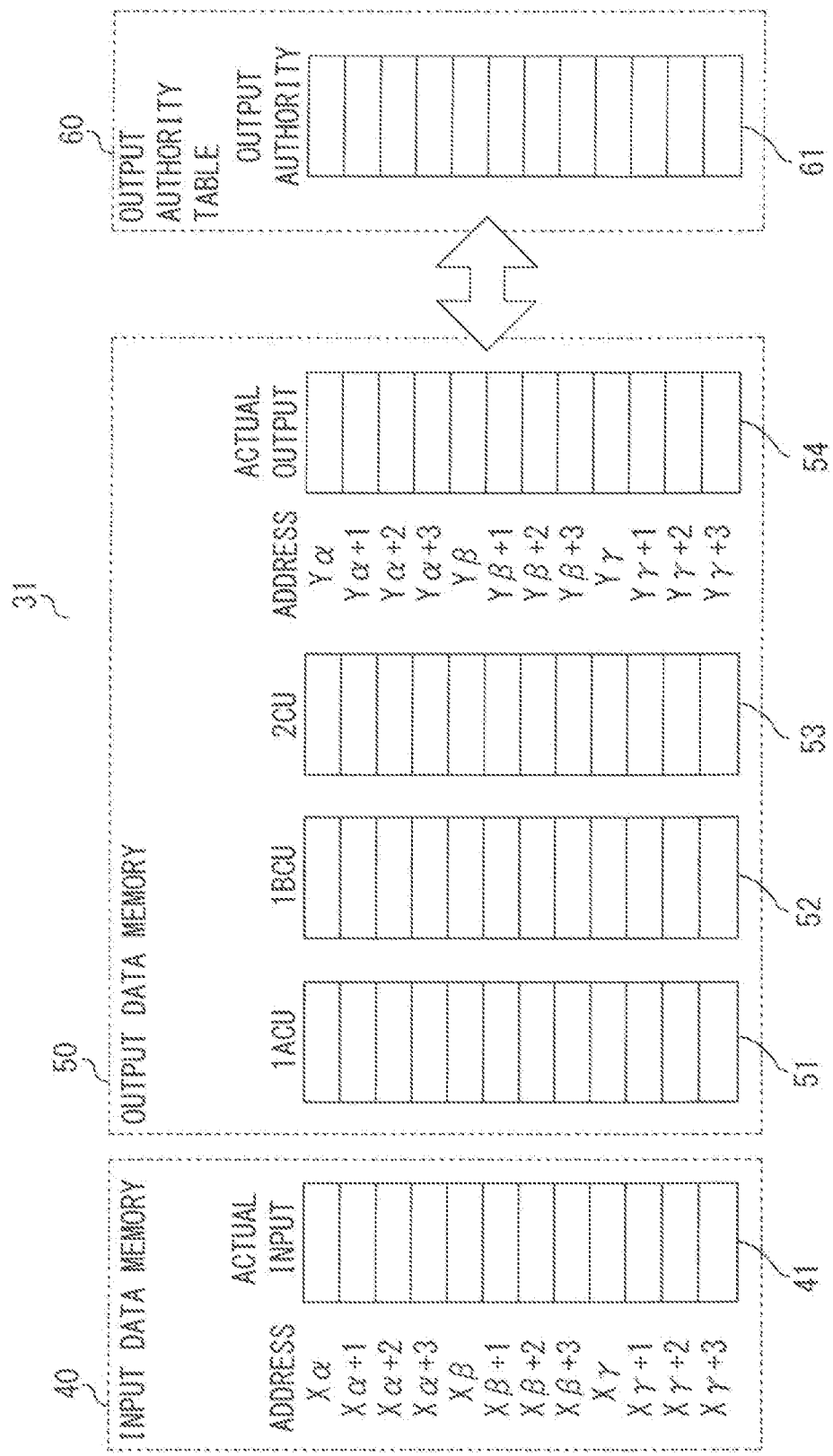
FIG. 2 is an internal configuration diagram of a process IO master device in the distributed control system according to embodiment 1 of the present invention.

In FIG. 2, the input data memory 40 includes an actual input area 41 which is divided into several areas by addresses $X\alpha$ to $X\alpha+n$, addresses $X\beta$ to $X\beta+n$, and addresses $X\gamma$ to $X\gamma+n$.

It is noted that n differs depending on the system and is optional. In FIG. 2, n is 3.

In FIG. 2, the actual input area is written as actual input.

Correspondence of the sensors of the process IO modules 100 to 110 can be set such that, for example, the sensors of the process IO module 100 corresponds to the address $X\alpha$ to $X\alpha+3$, the sensors of the process IO module 101 corresponds to the address $X\beta$ to $X\beta+3$, and the sensors of the process IO module 102 corresponds to the address $X\gamma$ to $X\gamma+3$.

In FIG. 2, the output data memory 50 includes a first A control device area 51, a first B control device area 52, a second control device area 53, and an actual output area 54.

In FIG. 2, the first A control device area is written as 1ACU, the first B control device area is written as 1BCU, the second control device area is written as 2CU, and the actual output area is written as actual output.

The first A control device area 51 to the actual output area 54 are divided by addresses $Y\alpha$ to $Y\alpha+n$, addresses $Y\beta$, to $Y\beta$, +n, and addresses $Y\gamma$ to $Y\gamma+n$.

It is noted that n differs depending on the system and is optional. In FIG. 2, n is 3.

The output authority table 60 includes an output authority area 61, and the output authority area 61 is divided by addresses $Y\alpha$ to $Y\alpha+n$, addresses $Y\beta$, to $Y\beta$, +n, and addresses $Y\gamma$ to $Y\gamma+n$.

In FIG. 2, the output authority area is written as output authority.

The output authority set in the output authority area 61 is for determining the control device (here, the control-system side of the first A control device 11 and the first B control device 12, or the second control device 20) of which output data is to be adopted and used as actual output data, or whether to hold the data (HOLD), for each address of the actual output area 54.

The output authority table 60 provides an authority for output data determination for each of the addresses corresponding to the actuators, but in the present embodiment 1, to ease understanding, the output authority area 61 is classified into three groups (addresses $Y\alpha$ to $Y\alpha+n$, addresses $Y\beta$, to $Y\beta$, +n, and addresses $Y\gamma$ to $Y\gamma+n$).

By having a mechanism for determining the actual output data, it becomes possible to easily switch the control device of which data is to be actually outputted to the actuator of the process IO module 100.

Next, the relationship between the actual input area 41 of the input data memory 40 and the first A control device area 51 to the actual output area 54 of the output data memory 50, and the control devices (first A control device 11, first B control device 12, second control device 20) and the process IO modules 100 to 110, will be described.

The input data inputted from the sensors of the process IO modules 100 to 110 are stored in the actual input area 41 in the input data memory 40.

The input data can be read by the control devices (first A control device 11, first B control device 12, second control device 20).

The actual output data to be outputted to the actuators of the process IO modules 100 to 110 are stored in the actual output area 54 in the output data memory 50.

Correspondence of the actuators of the process IO modules 100 to 110 can be set such that, for example, the actuators of the process IO module 100 corresponds to the addresses Yα to Yα+3, the actuators of the process IO module 101 corresponds to the addresses Yβ to Yβ+3, and the actuators of the process IO module 102 corresponds to the addresses Yγ to Yγ+3.

Next, the function of the output authority table 60 will be described with reference to FIG. 3 to FIG. 7, using a specific setting example.

First, a normal operation state will be described with reference to FIG. 3. Of the first A control device 11 and the first B control device 12, the first A control device 11 is set as a control system, and the first B control device 12 is set as a standby system. In addition, information that the first A control device 11 is set as a control system has been sent to the process IO master device.

Figure 3:
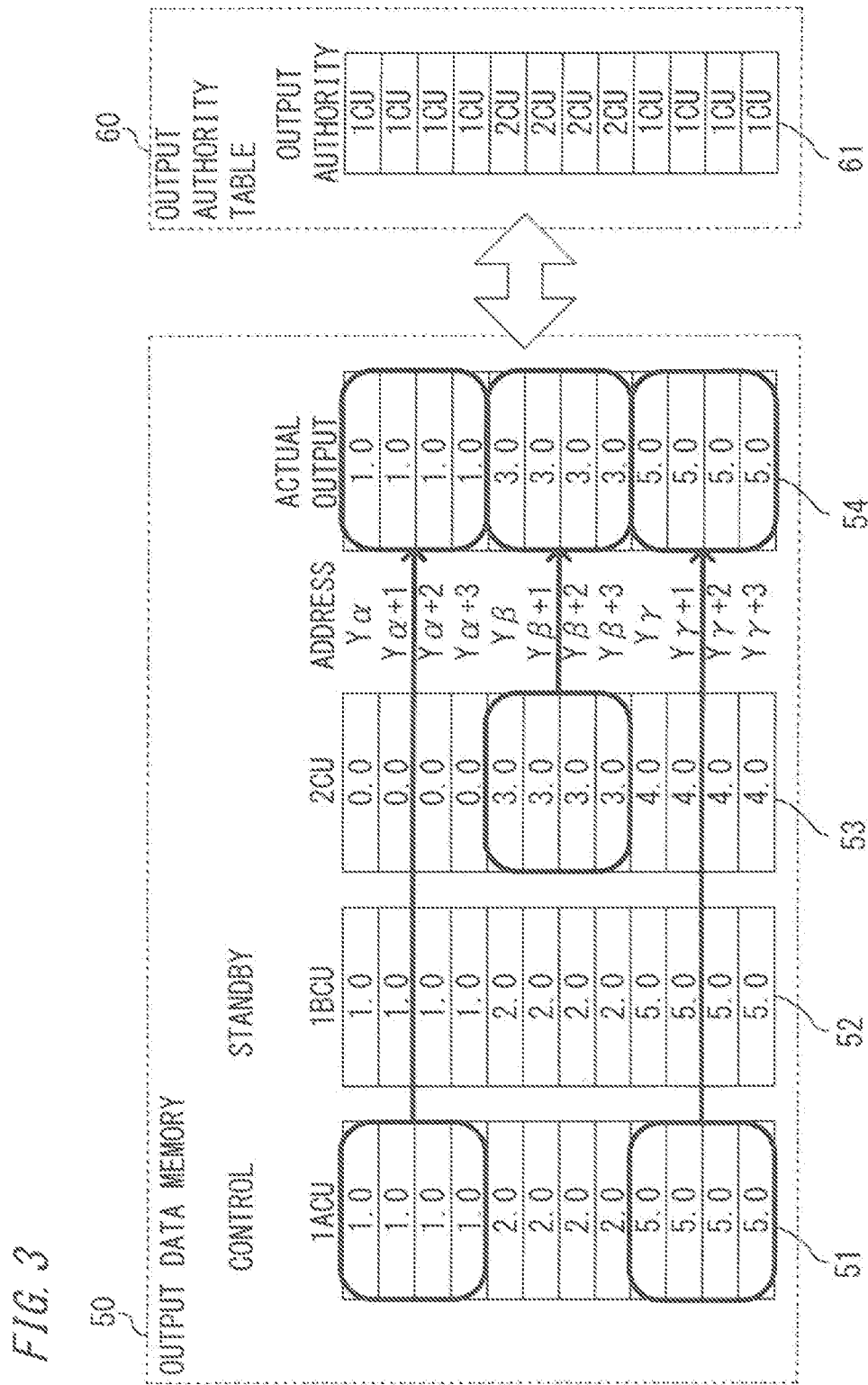
FIG. 3 illustrates the function of an output authority table in the distributed control system according to embodiment 1 of the present invention.

In FIG. 3, in the output authority area 61, the authorities at the addresses Yα to Yα+3 are set to the first control device, the authorities at the addresses Yβ, to Yβ, +3 are set to the second control device, and the authorities at the addresses Yγ to Yγ+3 are set to the first control device.

As described above, when the output authority is set to the first control device, information indicating which of the first A control device 11 and the first B control device 12 is the control-system-side device is separately received and output data from the control-system side is adopted. Therefore, operation that is not different from a conventional standby redundant configuration is possible.

In FIG. 3, output data from the first A control device 11 and the first B control device 12 are 1.0 at the addresses Yα to Yα+3, 2.0 at the addresses Yβ, to Yβ, +3, and 5.0 at the addresses Yγ to Yγ+3.

In addition, output data from the second control device 20 are 0.0 at the addresses Yα to Yα+3, 3.0 at the addresses Yβ, to Yβ, +3, and 4.0 at the addresses Yγ to Yγ+3.

In accordance with setting of the output authorities at the addresses in the output authority area 61, data are set at the addresses in the actual output area 54 as follows.

That is, 1.0 which is an output of the first A control device 11 is adopted at the addresses Yα to Yα+3, 3.0 which is an output of the second control device 20 is adopted at the addresses Yβ, to Yβ, +3, and 5.0 which is an output of the first A control device 11 is adopted at the addresses Yγ to Yγ+3.

Next, the function of the output authority table 60, i.e., a method for switching the control device of which output data is adopted as actual output data will be described with reference to FIG. 4 to FIG. 7. Here, an example in which a state of using output data from the first A control device 11 or the first B control device 12 as actual output data is switched to a state of using output data from the second control device 20 as actual output data, will be described.

Figure 4:
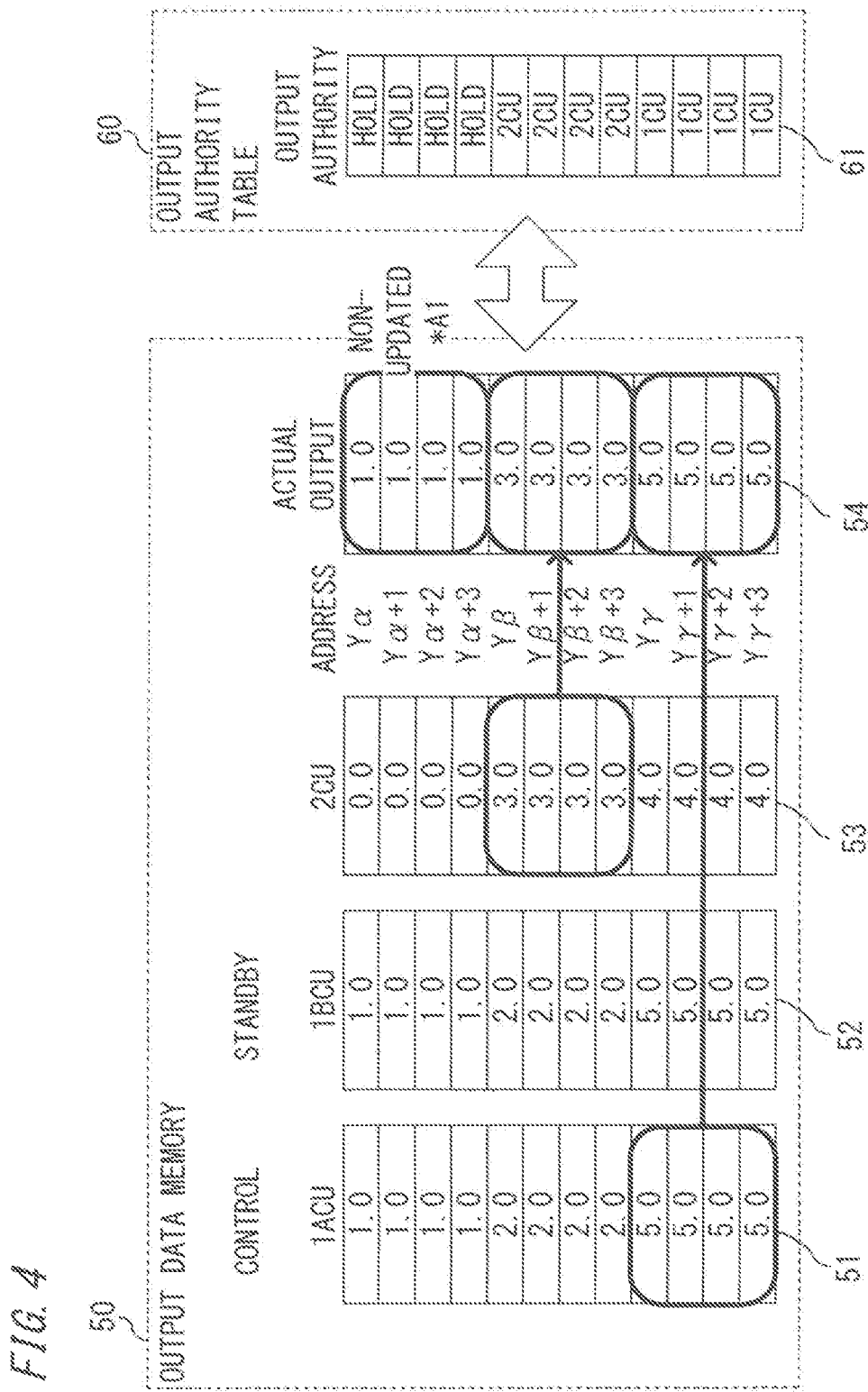
FIG. 4 illustrates the function of the output authority table in the distributed control system according to embodiment 1 of the present invention.

As shown in FIG. 4, the authorities at the output authority area addresses Yα to Yα+3 in the output authority table 60 are changed to HOLD (step 1). Accordingly, the actual output data at the addresses Yα to Yα+3 in the actual output area 54 are not updated (*A1).

Next, the control logic of the second control device 20 is rewritten and changed so as to output data (step 2).

Figure 5:
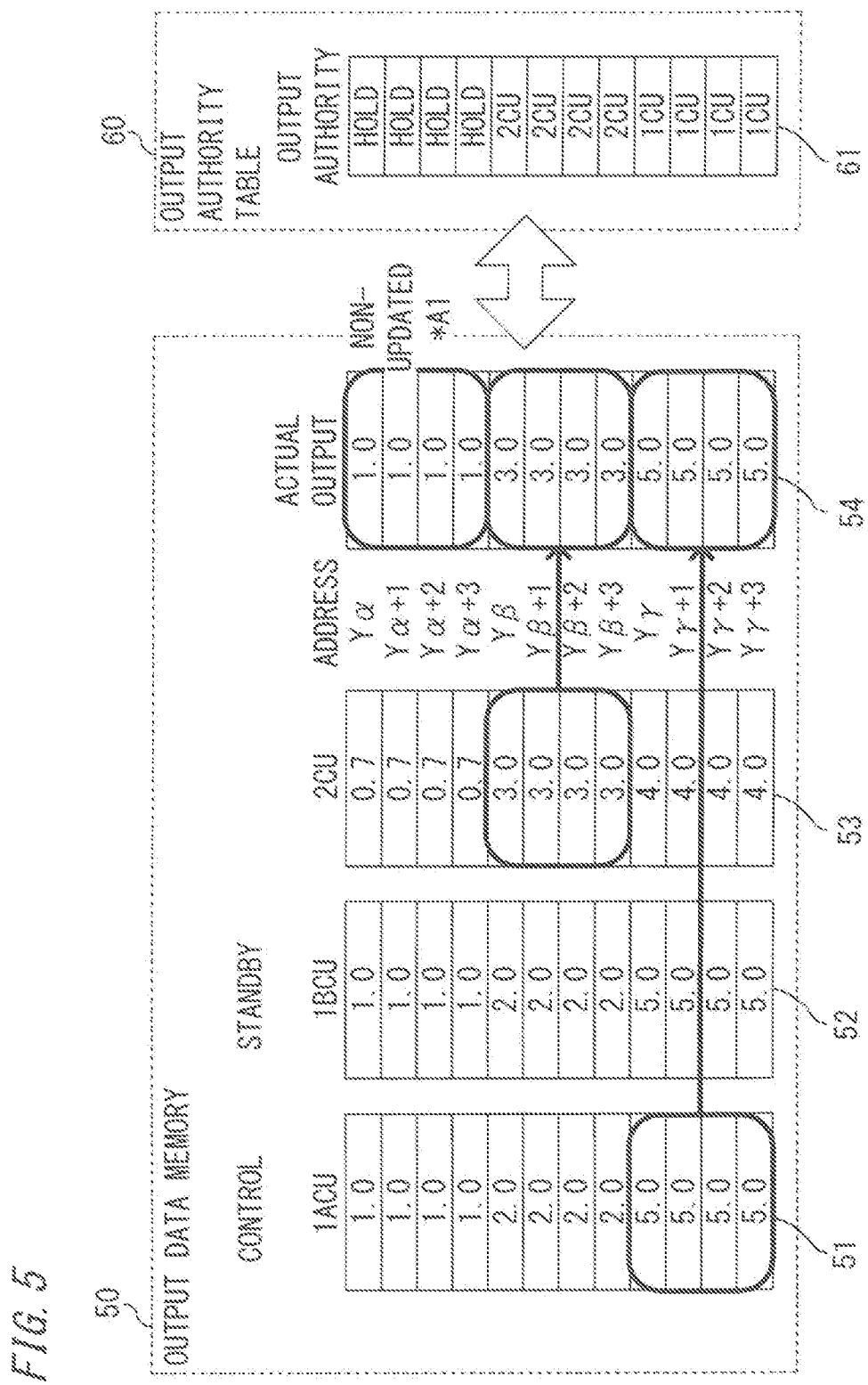
FIG. 5 illustrates the function of the output authority table in the distributed control system according to embodiment 1 of the present invention.

As shown in FIG. 5, the output authorities at the output authority area addresses Yα to Yα+3 in the output authority table 60 remain in a HOLD state, and the actual output data at the addresses Yα to Yα+3 in the actual output area 54 remain non-updated (*A1). However, the output data from the second control device 20 has changed from 0.0 to 0.7 at the addresses Yα to Yα+3.

Next, the control logics of the first A control device 11 and the first B control device 12 are rewritten (step 3).

Figure 6:
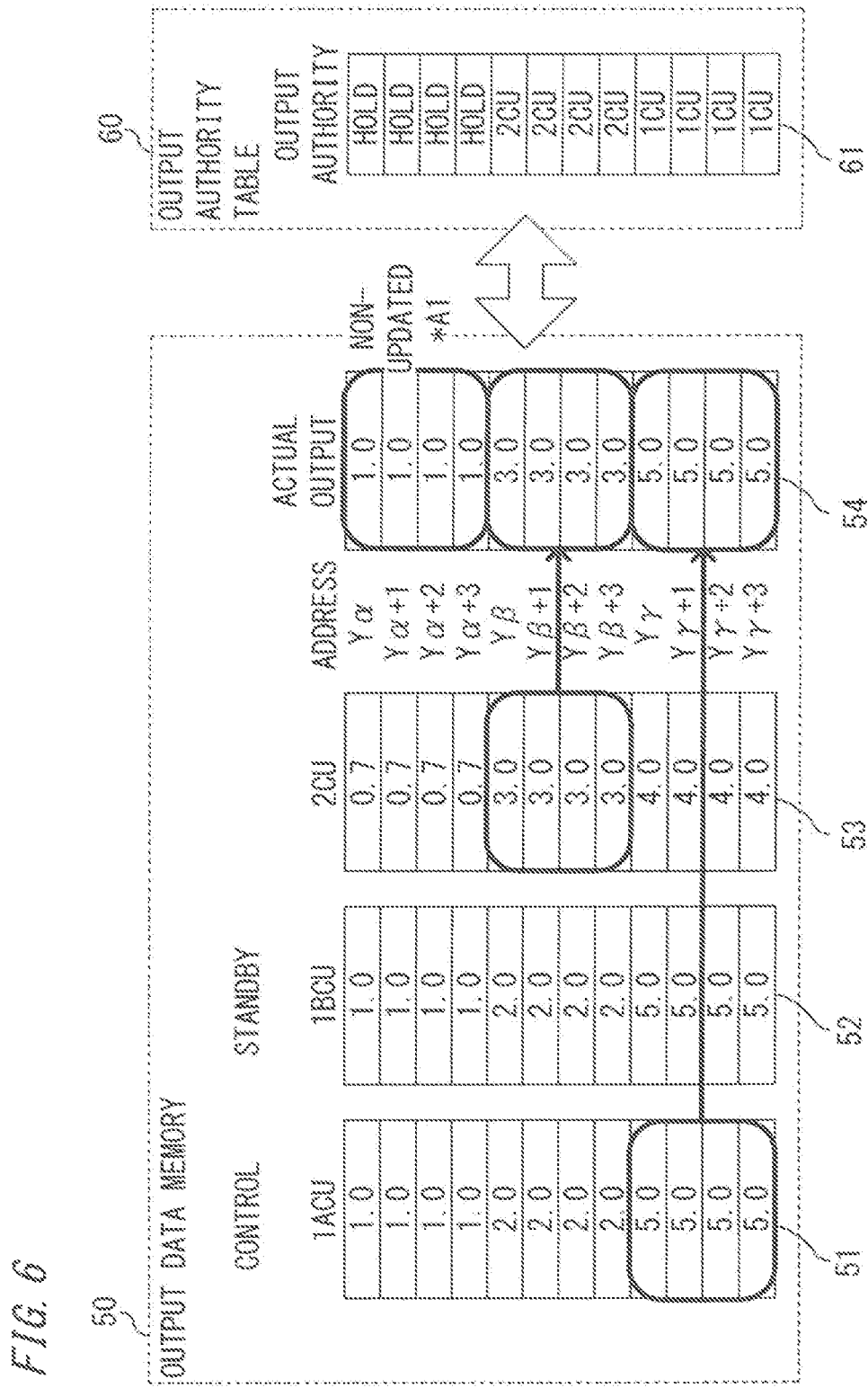
FIG. 6 illustrates the function of the output authority table in the distributed control system according to embodiment 1 of the present invention.

As shown in FIG. 6, the output authorities at the output authority area addresses Yα to Yα+3 in the output authority table 60 remain in a HOLD state, and the actual output data at the addresses Yα to Yα+3 in the actual output area 54 remain non-updated (*A1).

Next, the output authorities at the output authority area addresses Yα to Yα+3 in the output authority table 60 are changed from HOLD to a state of adopting an output of the second control device 20 (step 4).

Figure 7:
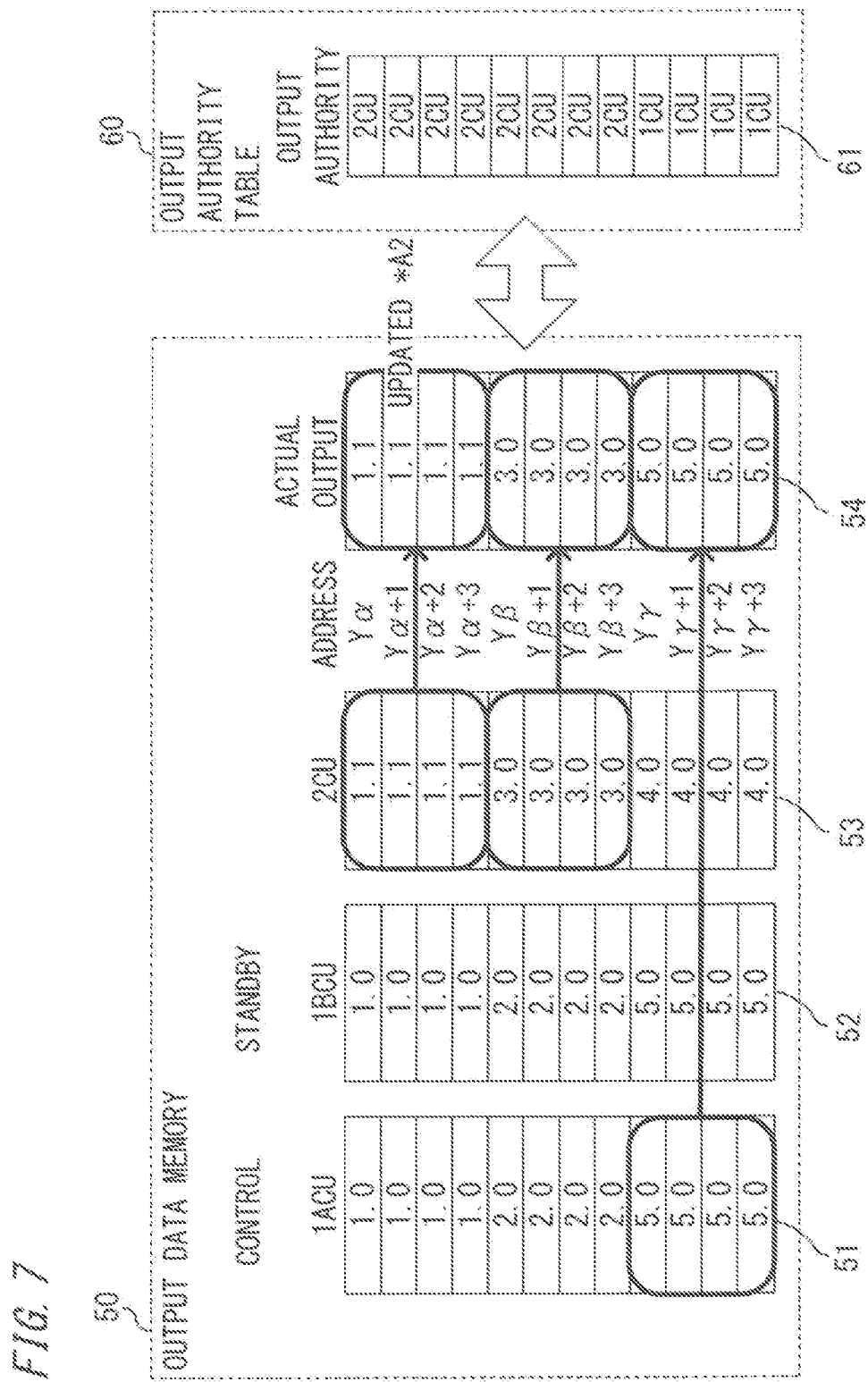
FIG. 7 illustrates the function of the output authority table in the distributed control system according to embodiment 1 of the present invention.

As shown in FIG. 7, since the output authorities at the output authority area addresses Yα to Yα+3 in the output authority table 60 have been changed to the second control device 20, the output data from the second control device 20 are adopted as the actual output data at the addresses Yα to Yα+3 in the actual output area 54, which are thus updated to 1.1 (*A2).

In the distributed control system 1 according to embodiment 1, the control devices which have control logics and perform control calculation are separated from the process IO master which performs output control. Therefore, without unnecessarily stopping the control calculation, it is possible to easily change the control device of which data is to be outputted to the actuator.

Therefore, although the distributed control system 1 has a configuration in which the process IO modules are shared by the control devices having a duplex configuration or a simplex configuration, from the perspective of individual control device, it is possible to make the same system designing as in a conventional configuration, i.e., a system including process IO master devices for individual distributed control devices, and thus usability for a user is not deteriorated.

As described above, the distributed control system according to embodiment 1 includes: the plurality of control devices; the process IO master device shared by the control devices and including the output authority table and the output data memory having areas for storing data outputted from the control devices; and the plurality of process IO modules each connected to the sensor and the actuator, wherein the output authority table provides an authority that determines the control device of which output data is to be adopted, for each of the addresses corresponding to the actuators. Therefore, without changing hardware with outside wires, it is possible to flexibly adapt to change of the actuator to which data is to be outputted, while sharing an input signal by the control devices.

Embodiment 2

In the distributed control system according to embodiment 1, the output authority table is configured such that the output authority is set for each address, whereas, in a distributed control system according to embodiment 2, the output authority table is configured such that the output authority is set on a block basis.

The entire configuration of the distributed control system according to embodiment 2 is basically the same as that in embodiment 1 (FIG. 1). A difference from embodiment 1 will be mainly described with reference to FIGS. 8A and 8B which illustrates the output authority table.

In FIGS. 8A and 8B, parts that correspond to or are the same as those in FIG. 1 and FIG. 2 in embodiment 1 are denoted by the same reference characters.

For the purpose of discrimination from embodiment 1, the distributed control system is denoted by 201.

FIG. 8A illustrates the output authority table 60 described in FIG. 7 in embodiment 1. The output authority is set for each address. Specifically, in the output authority area 61, the output authorities at the addresses Yα to Yα+3 is set to the second control device, the output authorities at the addresses Yβ, to Yβ, +3 are set to the second control device, and the output authorities at the addresses Yγ to Yγ+3 are set to the first control device.

Here, for example, the entirety (block) of the output authorities set to the second control device at the addresses Yα to Yα+3 can be considered to be one process IO module. This is indicated by symbol *B1 in FIG. 8A.

FIG. 8B illustrates the output authority table 60 in embodiment 2. An authority area 62 includes an address section, a size section, and an output authority section.

Here, to ease understanding, an example corresponding to the output authority table 60 described in FIG. 7 in embodiment 1 (i.e., FIG. 8A) is shown.

Specifically, the size at the address Yα is 4, and the output authority thereof is set to the second control device. The size at the address Yβ, is 4, and the output authority thereof is set to the second control device. The size at the address Yγ is 4, and the output authority thereof is set to the first control device.

That is, the output authority table 60 is configured on a block basis so as to integrate a plurality of addresses (e.g., Yα to Yα+3).

As described above, in the distributed control system according to embodiment 2, the output authority table is configured such that output authorities are set on a block basis. Therefore, in the distributed control system according to embodiment 2, as in embodiment 1, without changing hardware with outside wires, it is possible to flexibly adapt to change of the actuator to which data is to be outputted, while sharing an input signal by the control devices. Further, the size of the output authority table can be reduced, so that the hardware resource can be reduced.

Embodiment 3

A distributed control system according to embodiment 3 is configured such that, in the distributed control system according to embodiment 1, an input data change mechanism for changing input data inputted from the sensor is provided and the changed input data is acquired by the control devices.

Hereinafter, the distributed control system according to embodiment 3 will be described, focusing on a difference from embodiment 1, with reference to FIG. 9 and FIG. 10 which illustrate the input data change mechanism.

Figure 9:
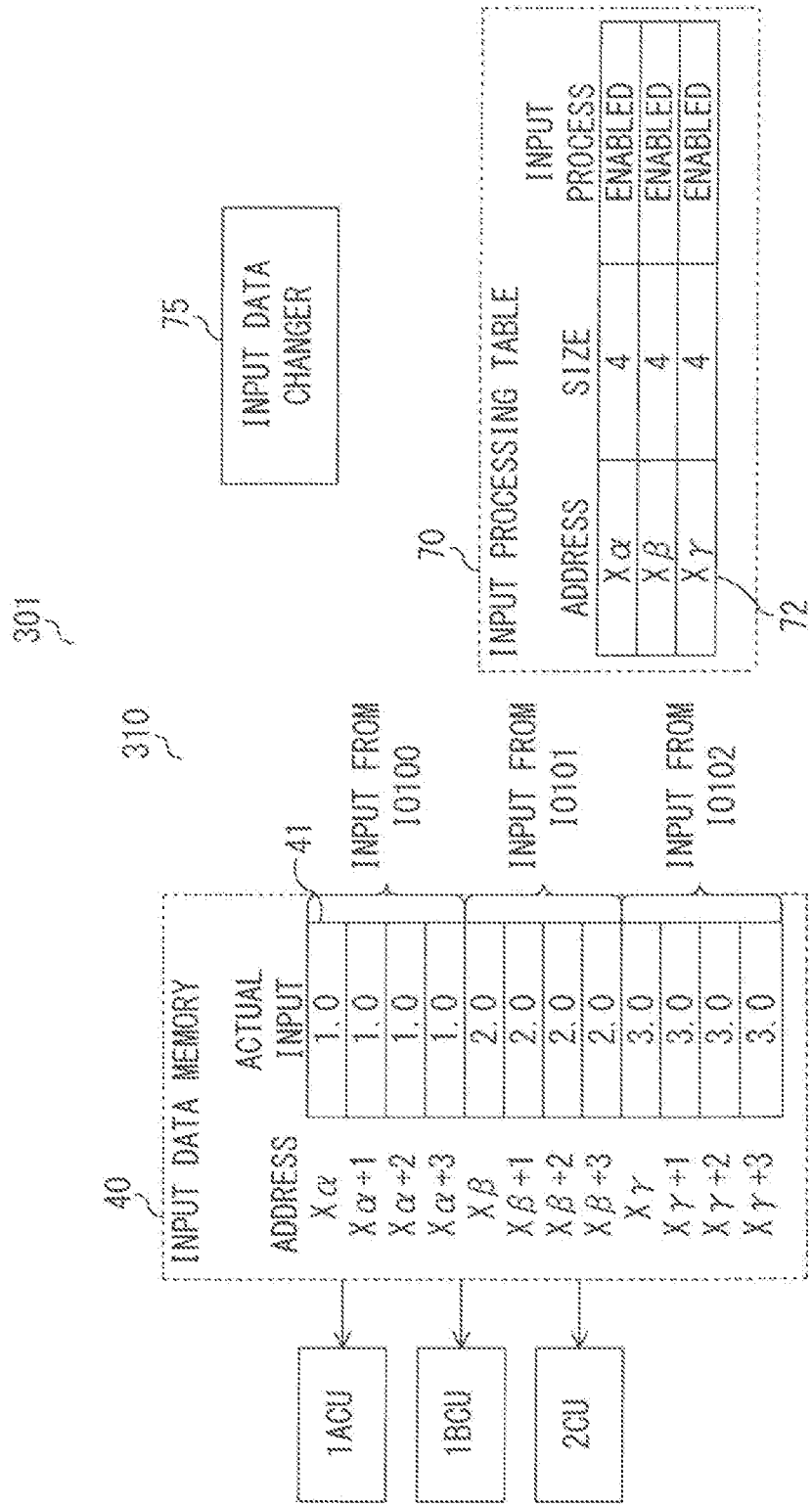
FIG. 9 illustrates an input data change mechanism in a distributed control system according to embodiment 3 of the present invention.
Figure 10:
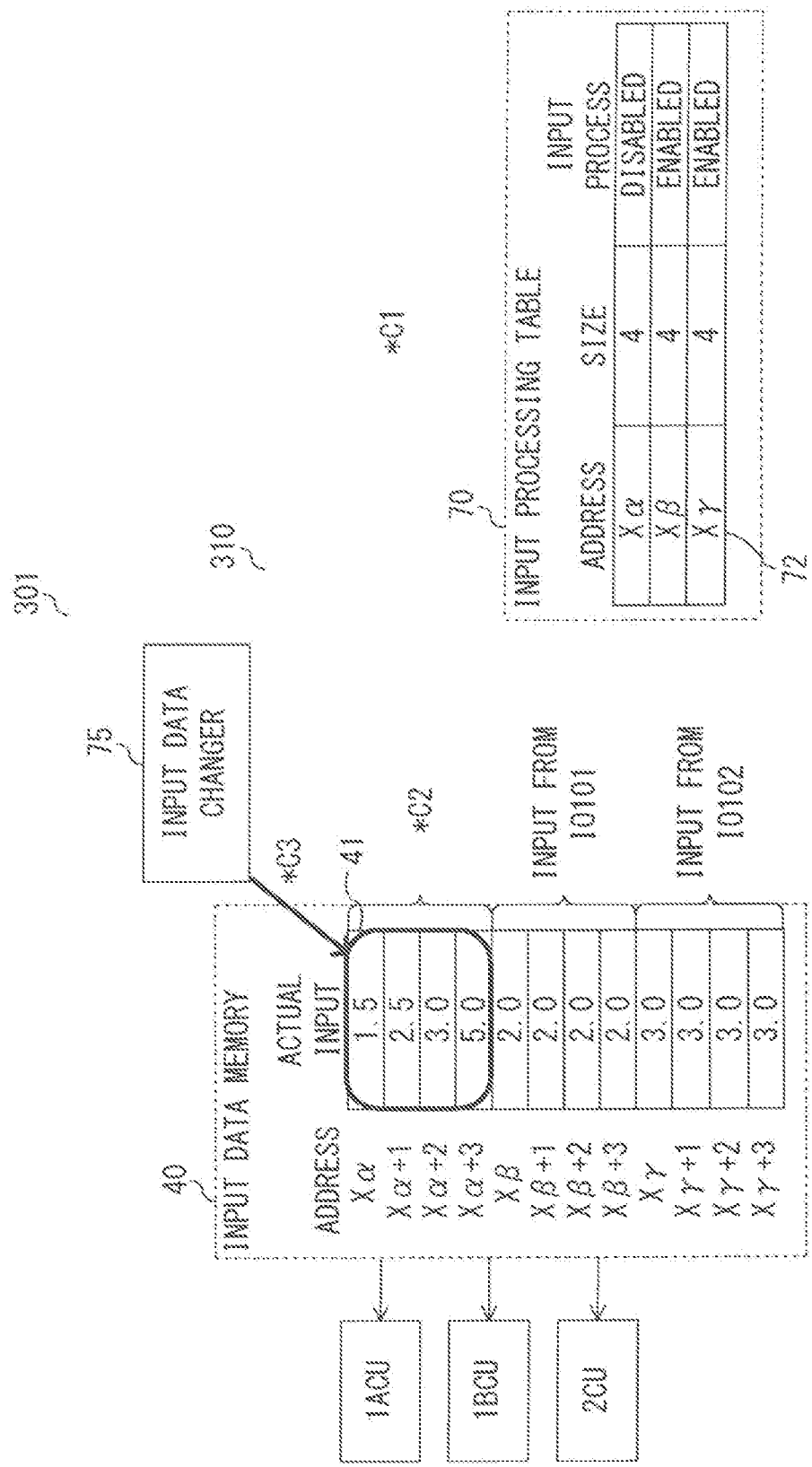
FIG. 10 illustrates the input data change mechanism in the distributed control system according to embodiment 3 of the present invention.

In FIG. 9 and FIG. 10, parts that correspond to or are the same as those in FIG. 1 and FIG. 2 in embodiment 1 are denoted by the same reference characters.

For the purpose of discrimination from embodiment 1, the distributed control system is denoted by 301.

First, the configuration of an input data change mechanism 310 of the distributed control system 301 will be described with reference to FIG. 9.

The input data change mechanism 310 includes the input data memory 40, an input processing table 70, and an input data changer 75.

The input data memory 40 includes the actual input area 41, and the actual input area 41 is divided by the addresses Xα to Xα+3, the addresses Xβ to Xβ+3, and the addresses Xγ to Xγ+3. Data from the sensor of the process IO module 100 is inputted to the addresses Xαto Xα+3. Data from the sensor of the process IO module 101 is inputted to the addresses Xβ to Xβ+3, and data from the sensor of the process IO module 102 is inputted to the addresses Xγ to Xγ+3.

In the drawings, the actual input area is written as actual input. In addition, in the drawings, the process IO module 100 is written as IO100, the process IO module 101 is written as IO101, and the process IO module 102 is written as IO102.

Data inputted from the sensors of the sensors/actuators 201 to 210 to the actual input area 41 are respectively read by the first A control device 11, the first B control device 12, and the second control device 20.

The input processing table 70 includes an address section, a size section, and an input processing section, as an input processing area 72. This area is configured on a block basis so as to correspond to the configuration of the actual input area 41 of the input data memory 40. Specifically, the size at the address Xα is 4, and an input process is set to be enabled. The size at the address Xβ is 4, and an input process is set to be enabled for all. The size at the address Xγ is 4, and an input process is set to be enabled.

FIG. 9 shows a normal state, and the input process of the input processing table 70 is set to be enabled. Since the input processing area 72 of the input processing table 70 is enabled, input data from the sensors of the process IO modules 100 to 102 are loaded onto the actual input area 41 of the input data memory 40.

As described later, when the input process of the input processing table 70 is disabled, the input data changer 75 changes the corresponding data in the actual input area 41 of the input data memory 40, to optional values.

Next, the manner of changing input data inputted from the sensor will be described with reference to FIG. 10.

First, the input process for the address Xα in the input processing table 70 is changed to be disabled (step 1). In the drawing, *C1 corresponds to step 1.

In response, the data (data inputted from the sensor of the process IO module 100) at the addresses Xa to Xa+3 in the actual input area 41 of the input data memory 40 become invalid (step 2). In the drawing, *C2 corresponds to step 2.

Next, the input data changer 75 changes the input data inputted from the sensor of the process IO module 100, to optional values (step 3). In the drawing, *C3 corresponds to step 3.

In FIG. 10, as an example, the data at the address Xa is changed to 1.5, the data at the address Xα+1 is changed to 2.5, the data at the address Xα+2 is changed to 3.0, and the data at the address Xα+3 is changed to 5.0.

Thus, in the first A control device 11, the first B control device 12, and the second control device 20, the values changed by the input data changer 75 are acquired as data inputted from the sensor of the process IO module 100.

Next, effectiveness of the input data change mechanism 310 described in the distributed control system 301 according to embodiment 3 will be described.

The case where input data from the sensor of the process IO module 100 is used in the first A control device 11, the first B control device 12, and the second control device 20, is assumed.

In desiring to experimentally change the input value and confirm the operation, if the input value is simulated on the control device side, operations of the control devices do not coincide with each other.

However, by providing the input data change mechanism 310 of the distributed control system 301, all the control devices (first A control device 11, first B control device 12, and second control device 20) can acquire the same data. Therefore, a test using input data shared by the control devices can be easily and properly conducted, and the efficiency of the test can be improved.

In the above description, the input data change mechanism 310 is added to the distributed control system 1 according to embodiment 1. However, the input data change mechanism may be added to the distributed control system 201 according to embodiment 2, whereby the efficiency of the test using input data shared by the control devices can be improved.

As described above, the distributed control system according to embodiment 3 is configured such that, in the distributed control system according to embodiment 1, the input data change mechanism for changing input data inputted from the sensor is provided and the changed input data is acquired by the control devices. Therefore, in the distributed control system according to embodiment 3, as in embodiment 1, without changing hardware with outside wires, it is possible to flexibly adapt to change of the actuator to which data is to be outputted, while sharing an input signal by the control devices. Further, the efficiency of the test using input data shared by the control devices can be improved.

Embodiment 4

A distributed control system according to embodiment 4 is configured such that a time-series data management mechanism for making management by providing time-series identification data to input data and output data is provided in the distributed control system according to embodiment 1.

Figure 11:
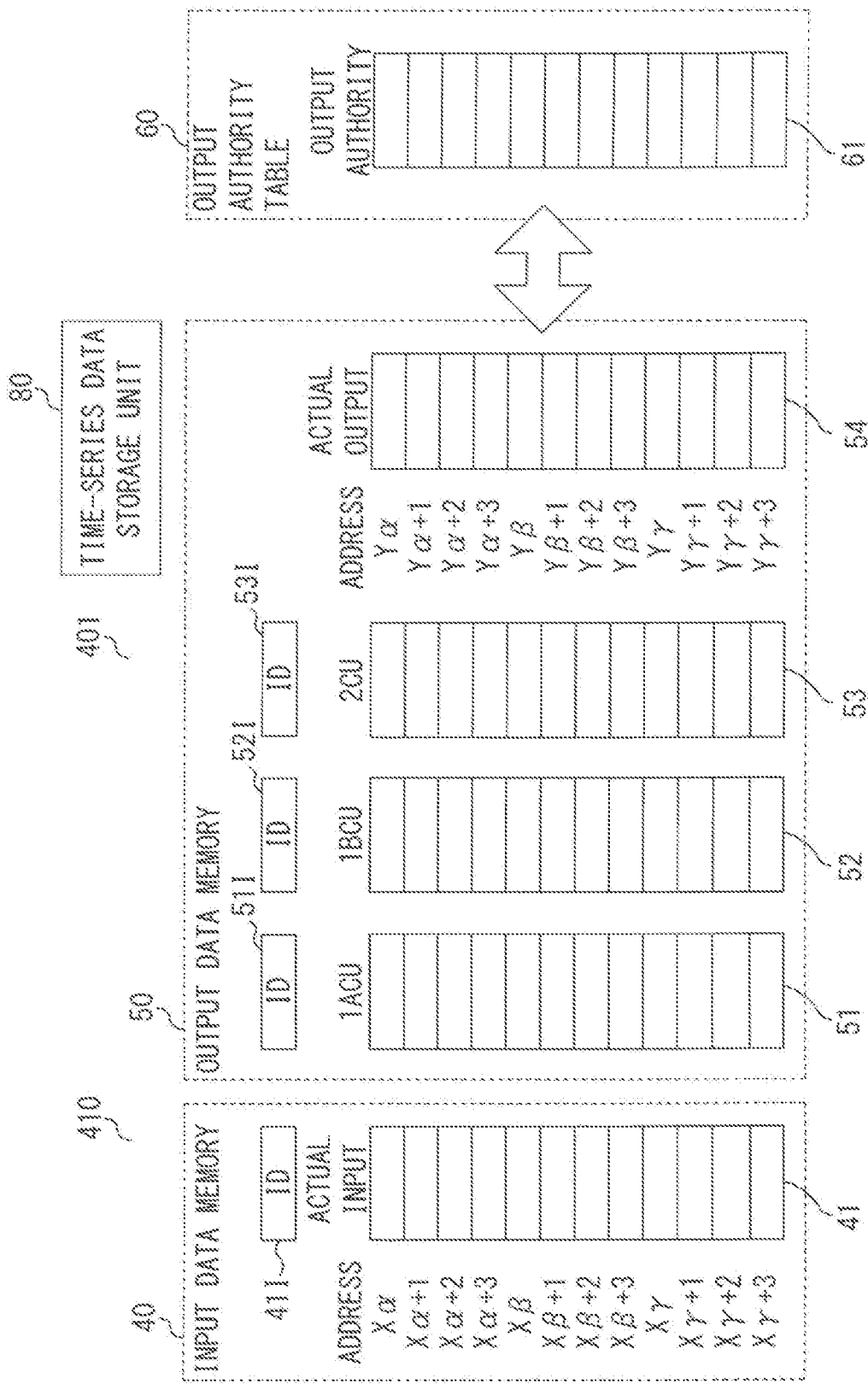
FIG. 11 illustrates a time-series data management mechanism in a distributed control system according to embodiment 4 of the present invention.
Figure 12:
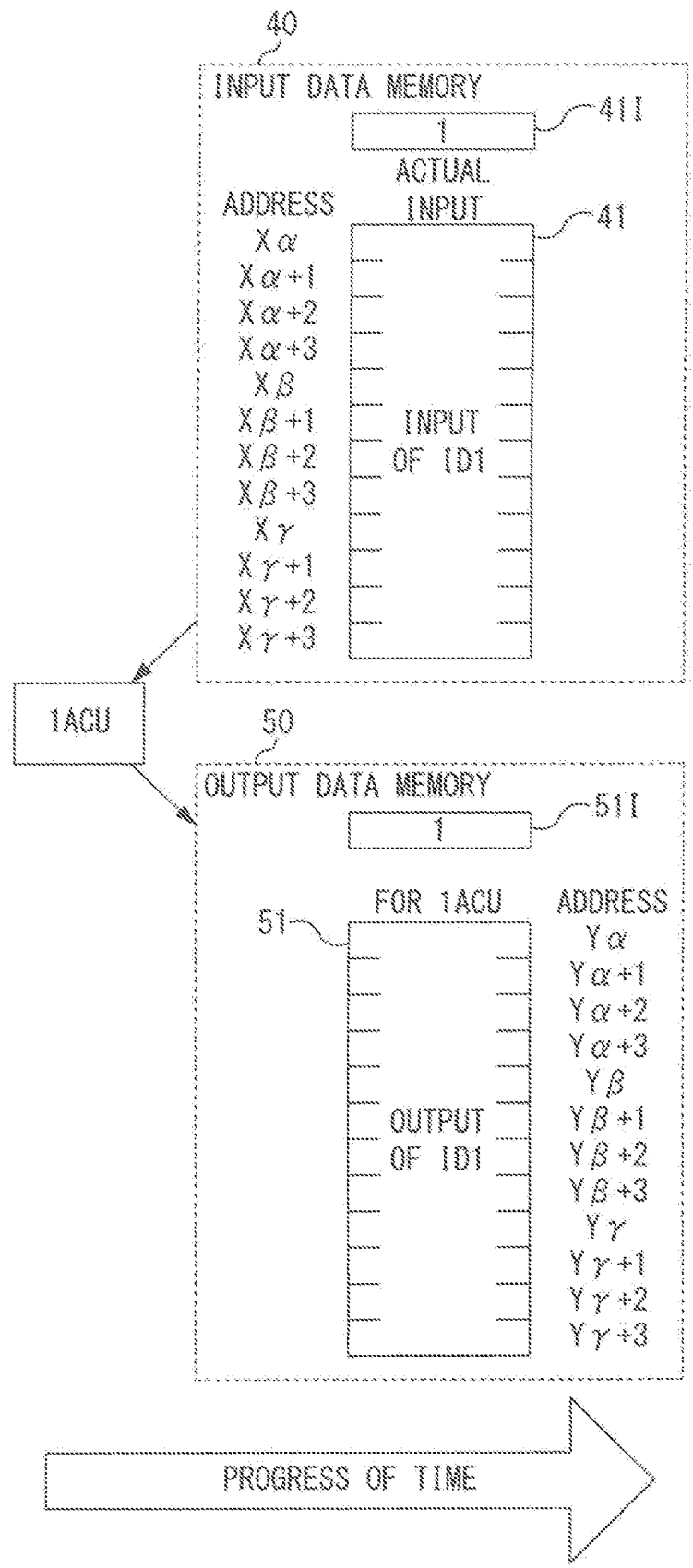
FIG. 12 illustrates time-series data in the distributed control system according to embodiment 4 of the present invention.
Figure 13:
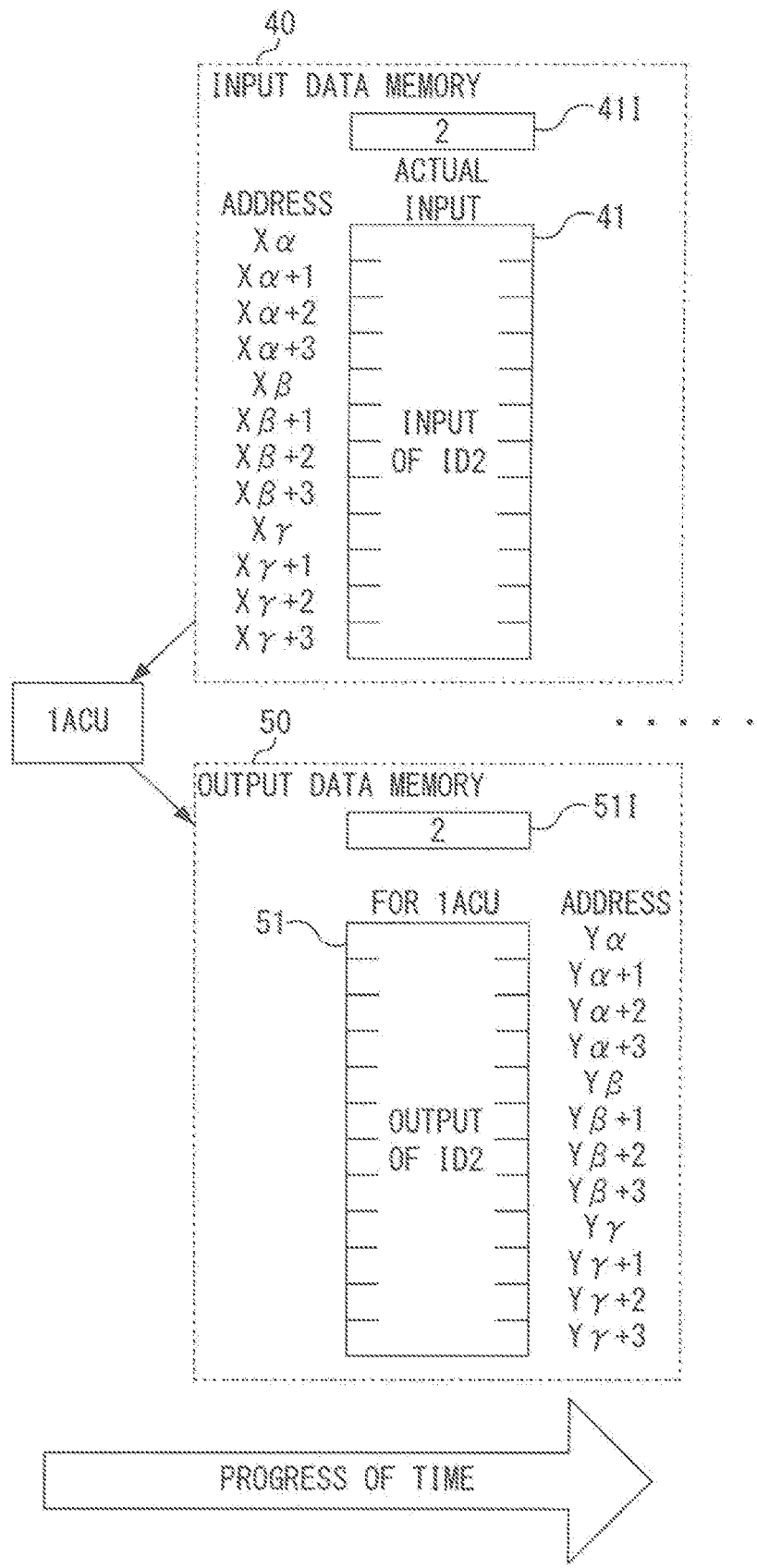
FIG. 13 illustrates time-series data in the distributed control system according to embodiment 4 of the present invention.
Figure 14:
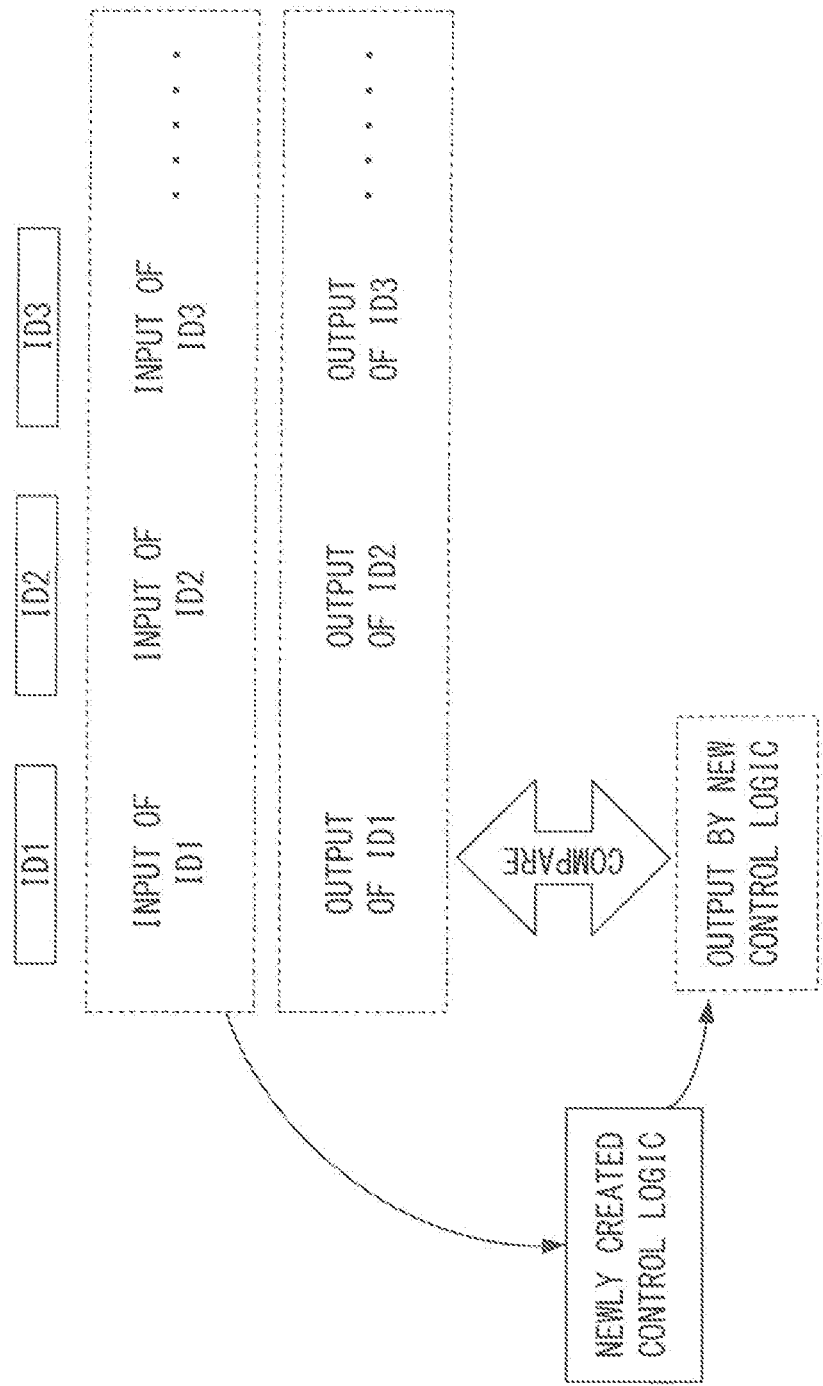
FIG. 14 illustrates an application example of time-series data in the distributed control system according to embodiment 4 of the present invention.

Hereinafter, the distributed control system according to embodiment 4 will be described, focusing on a difference from embodiment 1, with reference to FIG. 11 which illustrates the time-series data management mechanism, FIG. 12 and FIG. 13 which illustrate time-series data, and FIG. 14 which illustrates an application example of the time-series data. In FIG. 11 to FIG. 14, parts that correspond to or are the same as those in FIG. 1 and FIG. 2 in embodiment 1 are denoted by the same reference characters.

For the purpose of discrimination from embodiment 1, the distributed control system is denoted by 401.

First, the configuration of a time-series data management mechanism 410 of the distributed control system 401 will be described with reference to FIG. 11.

The time-series data management mechanism 410 includes the input data memory 40, the output data memory 50, the output authority table 60, and a time-series data storage unit 80.

The input data memory 40 includes the actual input area 41, and further includes input time-series data 41I.

The output data memory 50 includes the first A control device area 51, the first B control device area 52, the second control device area 53, and the actual output area 54, and further includes output time-series data 51I to output time-series data 53I correspondingly for the first A control device area 51 to the second control device area 53.

The output authority table 60 includes the output authority area 61, and the output authority area 61 is divided by the addresses $Y\alpha$ to $Y\alpha+n$, the addresses $Y\beta$, to $Y\beta+n$, and the addresses $Y\gamma$ to $Y\gamma+n$.

The time-series data storage unit 80 stores actual input data, output data of the first A control device 11, output data of the first B control device 12, and output data of the second control device 20, which are provided with time-series data.

The time-series identification data is incremented every input process in the process IO master device 31. In the drawings, the time-series identification data is written as ID.

Next, specific examples of input data and output data provided with time-series data and stored in the time-series data storage unit 80 will be described with reference to FIG. 12 and FIG. 13.

FIG. 12 shows data regarding the first A control device 11 provided with time-series identification data (here, 1), and actual input data and output data of the first A control device 11 at a given time are stored as a set.

FIG. 13 shows data regarding the first A control device 11 provided with time-series identification data (here, 2), at a time when a certain period has passed since the time in FIG. 12, and actual input data and output data of the first A control device 11 at this time are stored as a set.

Next, an application example of time-series data will be described with reference to FIG. 14.

In FIG. 14, as an example of data regarding the first A control device 11, a set of the actual input data and the output data of the first A control device 11 corresponding to each of the time-series identification data ID1, ID2, ID3, . . . is stored in the time-series data storage unit 80.

In FIG. 14, whether or not a newly created control logic has a function as designed is confirmed. Specifically, the actual input data corresponding to the time-series identification data ID1 is inputted to the newly created control logic, and the resultant output of the new control logic is compared with the output data of the first A control device 11.

Using the actual input data and the output data of the first A control device 11 corresponding to each of time-series identification data ID2, ID3, . . . , the function of the new control logic, i.e., the control operation thereof can be verified.

In the time-series data storage unit 80, it is not necessary to store all the data provided with time-series identification data, and in accordance with a target for which the control operation needs to be verified, data can be stored regularly or randomly for a desired control device.

In embodiment 4, the time-series data storage unit 80 is provided in the process IO master device 31. However, the time-series data storage unit 80 may be provided in each control device (first A control device 11, first B control device 12, and second control device 20), or outside the distributed control system 401.

In the above description, the time-series data management mechanism is added to the distributed control system 1 according to embodiment 1. However, the time-series data management mechanism may be added to the distributed control system 201 according to embodiment 2 or the distributed control system 301 according to embodiment 3.

As described above, the distributed control system according to embodiment 4 is configured such that the time-series data management mechanism for making management by providing time-series identification data to input data and output data is provided in the distributed control system according to embodiment 1. Therefore, in the distributed control system according to embodiment 4, as in embodiment 1, without changing hardware with outside wires, it is possible to flexibly adapt to change of the actuator to which data is to be outputted, while sharing an input signal by the control devices. Further, verification of control operation can be performed.

Embodiment 5

A distributed control system according to embodiment 5 is configured such that an output data difference detection mechanism for detecting a difference between output data outputted from the control device to the process IO master device and actual output data outputted to the actuator is provided in the distributed control system according to embodiment 1.

Figure 15:
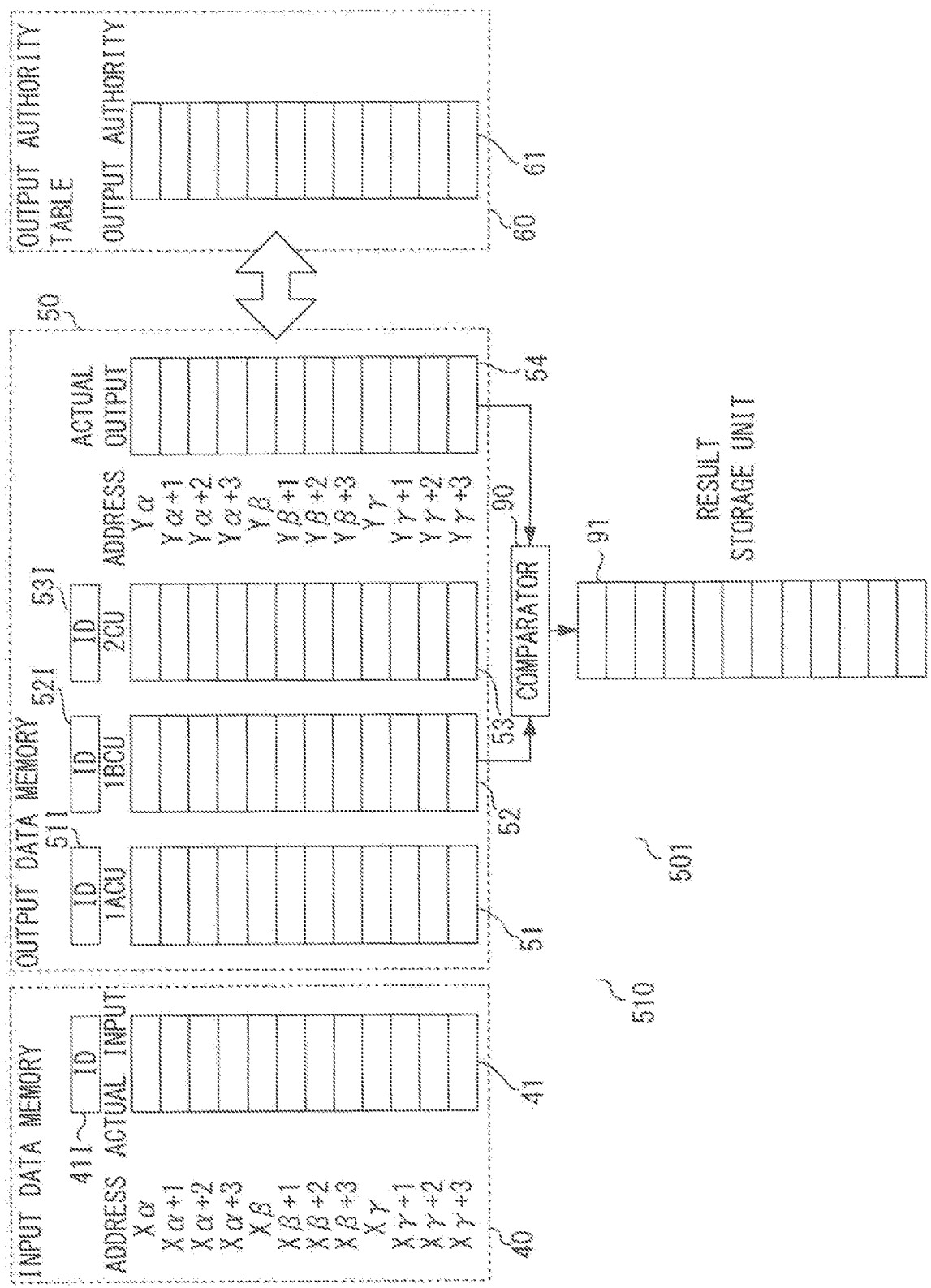
FIG. 15 illustrates an output data difference detection mechanism in a distributed control system according to embodiment 5 of the present invention.

Hereinafter, the distributed control system according to embodiment 5 will be described, focusing on a difference from embodiment 1, with reference to FIG. 15 which illustrates the output data difference detection mechanism. In FIG. 15, parts that correspond to or are the same as those in FIG. 1 and FIG. 2 in embodiment 1 are denoted by the same reference characters.

For the purpose of discrimination from embodiment 1, the distributed control system is denoted by 501.

First, the configuration of an output data difference detection mechanism 510 of the distributed control system 501 will be described with reference to FIG. 15.

The output data difference detection mechanism 510 includes the input data memory 40, the output data memory 50, the output authority table 60, a comparator 90, and a result storage unit 91.

The input data memory 40 includes the actual input area 41, and further includes the input time-series data 41I.

The output data memory 50 includes the first A control device area 51, the first B control device area 52, the second control device area 53, and the actual output area 54, and further includes output time-series data 51I to output time-series data 53I correspondingly for the first A control device area 51 to the second control device area 53.

The output authority table 60 includes the output authority area 61, and the output authority area 61 is divided by the addresses Yα to Yα+3, the addresses Yβ to Yβ+3, and the addresses Yγ to Yγ+3.

The comparator 90 compares the actual output data of the actual output area 54 with the output data of the control device (for example, first B control device) that is a comparison target.

The result storage unit 91 stores a result of the comparison by the comparator 90.

Next, an application example of the output data difference detection mechanism 510 will be described.

The first A control device 11 and the first B control device 12 have a duplex redundant configuration such that one of them is set as a control system and the other one is set as a standby system. In embodiment 5, it is assumed that the first A control device 11 is set as a control system and the first B control device 12 is set as a standby system.

The output data of the first B control device 12 set as a standby system is not adopted as actual input data, and therefore is not outputted to the actuator.

Therefore, even if the first B control device 12 set as a standby system has abnormality, the abnormality might not be revealed, and when the control system and the standby system are switched to each other (in this case, the first A control device 11 is switched to a standby system and the first B control device 12 is switched to a control system), the abnormality might be revealed.

As shown in FIG. 15, by always comparing the actual output data in the actual output area 54 and the output data of the first B control device using the output data difference detection mechanism 510, abnormality of the first B control device 12 can be detected in advance.

When the control logics of the first A control device 11 and the first B control device 12 are different from the control logic of the control device 2, some difference can occur, and therefore the comparison is performed only for the address areas where the output authorities are set to the first control devices.

In addition, there is a case where the control logics of the first A control device 11 and the first B control device 12 are the same as or partially the same as the control logic of the control device 2.

In this case, by comparing actual output data in the actual output area 54 and output data of the second control device for the address areas where the output authorities are set to the first control device, abnormality of the second control device 20 can be detected in advance. Therefore, it is possible to always monitor abnormality of the control device not provided with an output authority (i.e., control device in a standby state).

Further, in the case where abnormality is detected by always monitoring the control device that is in a standby state, the detection of abnormality can be reported to a superior system so as to prompt inspection and replacement.

In embodiment 5, the result storage unit 91 is provided in the process IO master device 31. However, the result storage unit 91 may be provided outside the distributed control system 501.

In the above description, the output data difference detection mechanism is added to the distributed control system 1 according to embodiment 1. However, the output data difference detection mechanism may be added to the distributed control systems according to embodiments 2 to 4.

As described above, the distributed control system according to embodiment 5 is configured such that the output data difference detection mechanism for detecting a difference between output data outputted from the control device to the process IO master device and actual output data outputted to the actuator is provided in the distributed control system according to embodiment 1. Therefore, in the distributed control system according to embodiment 5, as in embodiment 1, without changing hardware with outside wires, it is possible to flexibly adapt to change of the actuator to which data is to be outputted, while sharing an input signal by the control devices. Further, it is possible to always monitor abnormality of the control device that is in a standby state.

It is noted that, within the scope of the present invention, the above embodiments may be freely combined with each other, or each of the above embodiments may be modified or simplified as appropriate.

INDUSTRIAL APPLICABILITY

The present invention is capable of flexible adaptation to sharing of an input signal by control devices and change of an actuator to which data is to be outputted, without changing hardware with outside wires. Therefore, the present invention is widely applicable to distributed control systems.

The invention claimed is:

1. A distributed control system comprising:
    a plurality of control devices;
    a process IO master device shared by the control devices and including:
        an output authority table comprising a plurality of fields with each field being an output authority for either (a) a different respective address of a plurality of addresses of an actual output area or (b) a different respective set of addresses of a plurality of sets of addresses where the plurality of addresses of the actual output area comprises the plurality of sets of addresses, and
        an output data memory having:
            areas for storing data outputted from the control devices, and
            the actual output area different from the areas for storing data outputted from the control devices, the actual output area comprising the plurality of addresses; and
    a plurality of process IO modules connected to the process IO master device and each connected to a sensor and an actuator, wherein:
    the output authority table provides an authority that determines the control device of which output data is to be adopted and stored in the actual output area for output to the actuator, for each of addresses corresponding to the actuators and the areas, and
    the process IO master device is configured to, in response to a determination to switch from a first control device to a second control device of the plurality of devices, update the output authority table to indicate a hold for an address of the output authority table associated with the first control device such that the address is not updated until the hold in the output authority table is updated to indicate control by the second control device.

2. The distributed control system according to claim 1, wherein
    the output authority table provides the authority that determines the control device of which output data is to be adopted, for each set including a plurality of the addresses.

3. The distributed control system according to claim 1, wherein
    the process IO master device is provided with an input data change mechanism for changing input data inputted from each sensor, and
    the input data changed by the input data change mechanism is acquired by the control devices.

4. The distributed control system according to claim 1, wherein
    the process IO master device is provided with a time-series data management mechanism that provides time-series identification data to input data inputted from each sensor and the output data.

5. The distributed control system according to claim 3, wherein
    the process IO master device is provided with a time-series data management mechanism that provides time-series identification data to the input data and the output data.

6. The distributed control system according to claim 1, wherein
    the process IO master device is provided with an output data difference detection mechanism for detecting a difference between the output data outputted from each control device to the process IO master device and actual output data outputted to the corresponding actuator.

7. The distributed control system according to claim 2, wherein
    the process IO master device is provided with an input data change mechanism for changing input data inputted from each sensor, and
    the input data changed by the input data change mechanism is acquired by the control devices.

8. The distributed control system according to claim 2, wherein
    the process IO master device is provided with a time-series data management mechanism that provides time-series identification data to input data inputted from each sensor and the output data.

9. The distributed control system according to claim 7, wherein
    the process IO master device is provided with a time-series data management mechanism that provides time-series identification data to the input data and the output data.

10. The distributed control system according to claim 2, wherein
    the process IO master device is provided with an output data difference detection mechanism for detecting a difference between the output data outputted from each control device to the process IO master device and actual output data outputted to the corresponding actuator.

11. The distributed control system according to claim 3, wherein
    the process IO master device is provided with an output data difference detection mechanism for detecting a difference between the output data outputted from each control device to the process IO master device and actual output data outputted to the corresponding actuator.

12. The distributed control system according to claim 7, wherein
    the process IO master device is provided with an output data difference detection mechanism for detecting a difference between the output data outputted from each control device to the process IO master device and actual output data outputted to the corresponding actuator.

13. The distributed control system according to claim 4, wherein
    the process IO master device is provided with an output data difference detection mechanism for detecting a difference between the output data outputted from each control device to the process IO master device and actual output data outputted to the corresponding actuator.

14. The distributed control system according to claim 8, wherein
    the process IO master device is provided with an output data difference detection mechanism for detecting a difference between the output data outputted from each control device to the process IO master device and actual output data outputted to the corresponding actuator.

15. The distributed control system according to claim 5, wherein
    the process IO master device is provided with an output data difference detection mechanism for detecting a difference between the output data outputted from each control device to the process IO master device and actual output data outputted to the corresponding actuator.

16. The distributed control system according to claim 9, wherein
the process IO master device is provided with an output data difference detection mechanism for detecting a difference between the output data outputted from each control device to the process IO master device and actual output data outputted to the corresponding actuator.

* * * * *